UNITED STATES PATENT OFFICE.

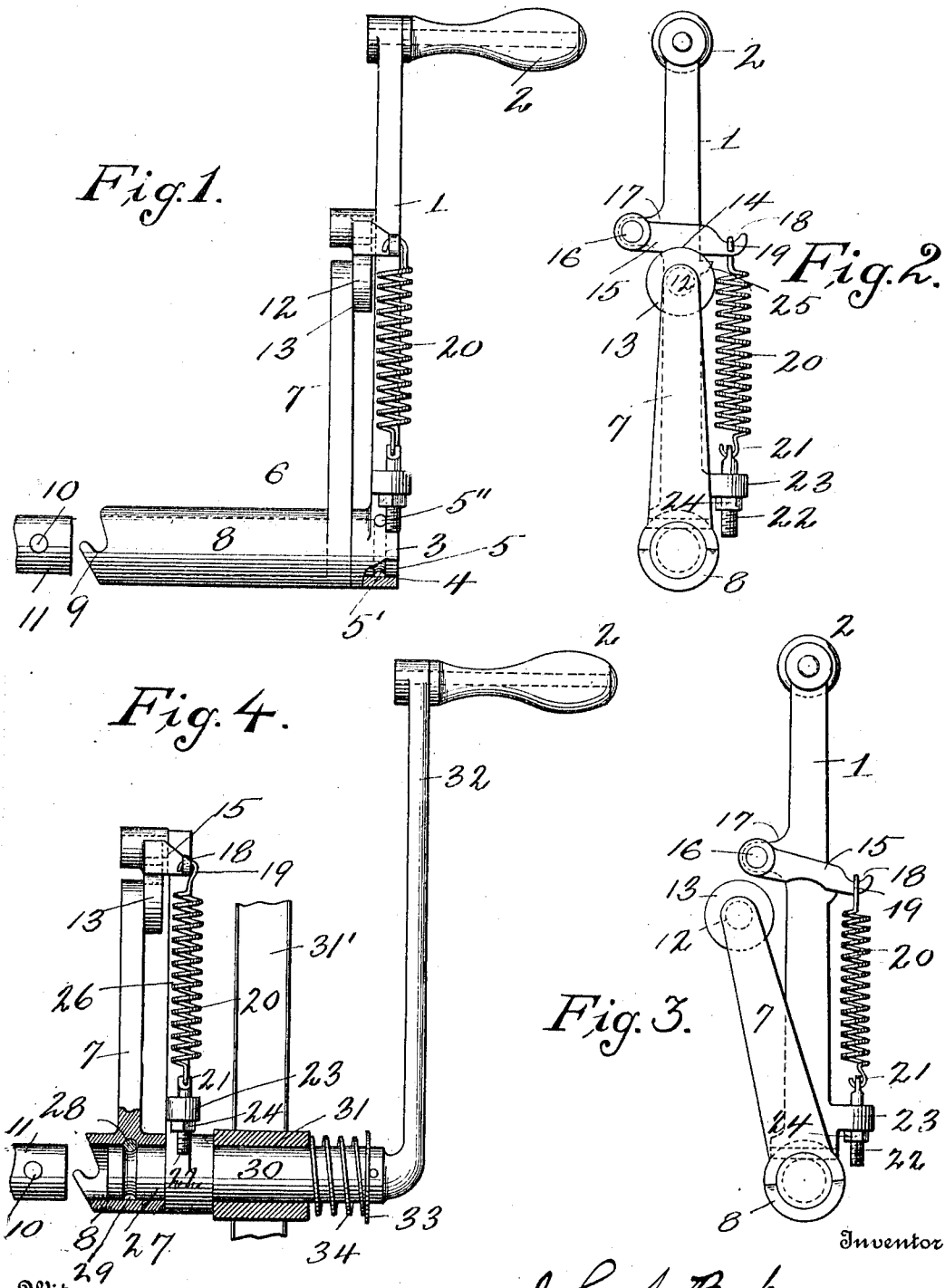

JOHN S. BAKER, OF EVANSVILLE, WISCONSIN.

STARTING-CRANK FOR EXPLOSIVE-ENGINES.

983,800.  Specification of Letters Patent.  Patented Feb. 7, 1911.

Application filed June 30, 1910. Serial No. 569,714.

*To all whom it may concern:*

Be it known that I, JOHN S. BAKER, a citizen of the United States, residing at Evansville, in the county of Rock and State of Wisconsin, have invented certain new and useful Improvements in Starting-Cranks for Explosive-Engines, of which the following is a specification.

This invention relates to improvements in starting cranks for explosive engines.

The object of the invention is to provide a simple and effective mechanism for starting or cranking explosive engines, that will eliminate the danger to the operator, in starting the engine, when the engine kicks backward.

This invention consists in a mechanism which connects the handle of the starting crank with the engine-shaft, with sufficient strength and positiveness for starting the engine, but which can be relied upon to disconnect the handle from the engine, when the engine kicks backward and exerts slightly more force in the hand of the operator than is required for starting or turning the engine over.

Referring to the drawings: Figure 1 is a side elevation of the improved crank, showing so much of an engine-shaft as is necessary to show the manner of coupling between the crank sleeve and said shaft; Fig. 2 is a rear elevation of the crank; Fig. 3 is a similar view, showing the connection between the crank and coupling broken; and Fig. 4 is a side elevation, showing a modified form of the invention, the view being in partial section.

Referring particularly to Figs. 1, 2 and 3 of the drawings, the numeral 1 designates the crank provided at one end with the usual handle 2. At the other end of the crank, I provide a sleeve 3, having an opening 4 therein, into which fits the short trunnion 5 which is preferably integral with the coupling 6. The trunnion 5 is provided with an annular groove 5', in which rests a portion of a pin 5''. This groove and pin connection between the crank and coupling 6 serves to permit an independent axial movement of the two parts, while preventing their separation longitudinally. The coupling 6 consists of an arm 7 and a sleeve 8. At the lower end of the sleeve is provided the usual notches 9, for engagement with the pin 10 on the end of the engine-shaft 11. Trunnioned at 12 on the outer end of the arm 7 is a roller 13, which normally engages a notch 14 in the dog 15, which notch conforms to the periphery of the roller. This dog is pivoted at 16, to an integral laterally extending projection 17 on the crank 1 and said dog extends laterally across said handle and its front end is provided with a hook 18 for engagement with a hook 19 of a spiral spring 20. This spring is provided with a second hook 21, for engagement with the eye-bolt 22, which passes through the opening in a laterally projecting ear 23, preferably integral with the crank 1. The eye-bolt is provided with an adjusting nut 24, by which the tension of the spring 20 may be varied, for the obvious purpose of varying the force of contact between the dog 14 and the roller 13. At one side of the crank I provide a stop 25, to limit the inward movement of the dog 15, when the connection between the coupling 6 and the crank is broken. The notch in the dog 15 is so shaped that a greater amount of force will be required to break the rigid connection between the crank and coupling, in turning the crank forward in the cranking operation, than is required in readjusting or resetting the parts after the connection has been broken, that is to say, the notch is slightly deeper toward the free end of the dog than toward the pivoted end.

In the modification, Fig. 4, is shown a construction in which the mechanism for normally establishing rigid connection between the crank and coupling is concealed behind the radiator, immediately in front of the engine. In this form, the construction of the mechanism for connecting the crank and coupling is identical with that shown in the main view. Referring now to Fig. 4, I provide an arm 26 which, in the main views, was continued to form the crank. This arm 26 is provided with a trunnion 27 at its inner end, which enters the sleeve 8 and is pinned to said sleeve by means of a pin 28 which extends transversely of the sleeve, and lies partly in a groove 29 in the trunnion 27, so that the arm 26 and coupling 6 may be turned independently of each other, while said parts will be prevented from sliding apart. Preferably integral with the arm 26 is the crank shaft 30, which passes through a suitable bearing 31, in the radiator 31'. This shaft 30 is provided at its outer end with the usual crank 32 and interposed between the front of the radiator and a collar 33 carried by the crank-shaft, is the usual spring 34, for keeping the crank normally out of engagement with the engine-shaft.

In the construction shown and described, it will be noted that the crank and coupling 7 are held rigidly together under the tension of the spring 20, and when the parts are in this position, the crank is operated in the usual way to start the engine, the coupling being of sufficient strength for this purpose, but should the engine kick suddenly backward, exerting more force on the hand of the operator than is required for starting, such excessive force would be sufficient to roll the roller out of the notch in the dog and thus disconnect the coupling from the crank, thus eliminating the danger of serious accident to the operator.

It will be understood that the construction of the mechanism shown may be changed or varied within the scope of this invention. For instance, the axis upon which the dog 15 turns, need not be parallel to the axis on which the handle turns, or for instance, the axis of the handle need not coincide with the axis of the coupling.

Having thus described my invention, what I claim as new is:—

1. A starting crank for engines, comprising a member adapted to be coupled to the engine-shaft, another member pivoted thereto, a dog carried by one of the members, a roller carried by the other, and means for holding said dog and roller in close contact, whereby rigid relationship between the two members is effected, substantially as and for the purpose set forth.

2. A starting crank for engines, comprising a member adapted to be coupled to the engine-shaft, another member pivoted thereto, a roller carried by one member, a dog carried by the other member, and a spring acting upon said dog to keep the same in close contact with the roller to effect rigid relationship between the two members under normal conditions, substantially as and for the purpose set forth.

3. A starting crank for engines, comprising a member adapted to be coupled to an engine-shaft, another member pivoted thereto, a roller journaled upon one member, a dog pivoted to the other member and adapted to engage the roller, a spring acting on the dog to hold the same in close contact with the roller, whereby rigid relationship between the two members is established, under normal conditions, and means for varying the stress of the spring, substantially as described.

4. A starting crank for engines, comprising a member adapted to be coupled to an engine-shaft, another member pivoted thereto, a roller journaled upon one member, a dog pivoted to the other member, and having a notch therein adapted to be entered by the roller, and a spring acting upon the dog to hold the same in close contact with the roller, whereby rigid relationship between the two members is established under normal conditions, substantially as described.

5. A starting crank for engines, comprising a member adapted to be coupled to an engine-shaft, another member pivoted thereto, a roller journaled to one of said members, a dog pivoted to the other member and having a notch therein adapted to be entered by the roller, said notch being so formed that a greater force will be required to break the rigid relationship between the members in turning the crank forward than is required to reset said members and reëstablish said rigid relationship, and a spring acting upon the dog to hold the same in close contact with the roller, whereby rigid relationship between the two members is established under normal conditions, substantially as described.

6. A starting crank for engines, comprising a member adapted to be coupled to an engine-shaft, another member pivoted thereto, a roller journaled upon one of said members and a dog pivoted to the other of said members and adapted to engage the roller, a spring acting on the dog to hold the same in close contact with the roller, whereby rigid relationship between the two members is established under normal conditions, and a suitable stop for limiting the inward movement of the dog when the rigid relationship of the two members is broken.

7. A starting crank for engines, comprising a member adapted to be coupled to an engine-shaft, another member pivoted thereto, a roller journaled upon one of said members, a dog pivoted to the other member and adapted to engage the roller, a spring acting on said dog to hold the same in close contact with the roller, whereby rigid relationship between the two members is established under normal conditions, and a crank-shaft carried by one of said members, and provided with a suitable crank.

8. A starting-crank for engines, comprising a crank-arm adapted to be coupled to the engine-shaft, a coupling arm pivoted thereto, a dog carried by the crank-arm, a roller carried by the coupling-arm, and means for holding the dog into engagement with the roller, whereby the crank and coupling-arms are normally locked together.

9. A starting-crank for explosive engines, comprising a crank-arm adapted to be coupled to the engine-shaft, a coupling-arm pivoted thereto, a notched dog pivoted on the crank-arm, a roller carried by the coupling-arm, and a spring for holding the dog into engagement with the roller, whereby the coupling-arm is normally held into locked engagement with the crank-arm.

In testimony whereof I affix my signature in presence of two witnesses.

JOHN S. BAKER.

Witnesses:
 THOMAS DURANT,
 TITIAN W. JOHNSON.